United States Patent [19]

König

[11] 4,238,370

[45] Dec. 9, 1980

[54] OXIDATION CATALYST AND METHOD FOR ITS MANUFACTURE

[75] Inventor: Peter König, Budapest, Hungary

[73] Assignee: Tioxide Group Limited, Billingham, England

[21] Appl. No.: 75,409

[22] Filed: Sep. 14, 1979

[30] Foreign Application Priority Data

Jul. 24, 1979 [GB] United Kingdom ............... 25802/79

[51] Int. Cl.³ .......................... B01J 21/06; B01J 23/22
[52] U.S. Cl. .................................. 252/461; 260/346.7
[58] Field of Search ..................... 252/461; 260/346.7; 423/213.2

[56] References Cited

U.S. PATENT DOCUMENTS

| 3,215,644 | 11/1965 | Kakinoki et al. | 252/456 X |
| 4,012,338 | 3/1977 | Urwin | 252/461 |

FOREIGN PATENT DOCUMENTS 1238379  7/1971  United Kingdom .
1444799  8/1976  United Kingdom .

*Primary Examiner*—W. J. Shine
*Attorney, Agent, or Firm*—Schuyler, Banner, Birch, McKie & Beckett

[57] ABSTRACT

A method for the manufacture of a total oxidation catalyst in which titanium dioxide is treated with vanadium pentoxide and then washed until the wash liquid is substantially free of vanadium pentoxide. This method produces a catalyst which will totally oxidize an oxidizable organic compound to carbon dioxide.

14 Claims, No Drawings

OXIDATION CATALYST AND METHOD FOR ITS MANUFACTURE

This invention relates to catalysts and particularly to a method for the manufacture of a total oxidation catalyst.

Catalysts comprising titanium dioxide carrying vanadium pentoxide are useful for the selective oxidation of, for example, o-xylene to phthalic anhydride but such catalysts have not catalysed the total oxidation of the organic compounds to carbon dioxide and water.

It is now becoming increasingly important to minimise pollution of the atmosphere which is caused by organic compounds such as unburnt hydrocarbons arising from the use of such compounds as fuels and expensive catalysts have been proposed to effect a reduction in the emission to the atmosphere of such waste products.

According to the present invention a method for the manufacture of a total oxidation catalyst comprises selecting a catalyst substrate comprising titanium dioxide, treating the substrate with a source of vanadium pentoxide, if necessary heating the treated substrate, washing the treated substrate with a wash liquid until the wash liquid is substantially free of vanadium pentoxide and recovering the washed total oxidation catalyst thereby obtained.

According to the invention also a method for the total oxidation of an oxidisable organic compound comprises heating a catalyst prepared in accordance with the method of the immediately preceding paragraph and contacting the organic compound to be oxidised in the presence of an oxygen-containing atmosphere with the heated catalyst.

Surprisingly, by the method of the present invention it has been found possible to prepare a catalyst which is useful to effect the total oxidation of an oxidisable organic compound whereas a catalyst prepared by a similar method but without washing the treated substrate acts as a selective oxidation catalyst and is of very little value in catalysing the total oxidation of an oxidisable organic compound.

The titanium dioxide to be treated in the method of the invention can be that produced by the well known "sulphate" process in which titanyl sulphate is hydrolysed to form hydrous titanium dioxide and this product is then calcined at an elevated temperature. Alternatively, the titanium dioxide can be that produced by the well known "chloride" process in which titanium tetrachloride is oxidised in the vapour phase to produce the titanium dioxide particulate product without further calcination. Also the titanium dioxide to be used as the catalyst substrate can be formed by neutralising with ammonia an aqueous solution of titanium tetrachloride and the precipitated product then calcined at an elevated temperature.

If desired, the catalyst substrate can be rutile titanium dioxide or anatase titanium dioxide and, if desired, the particulate titanium dioxide can be sieved prior to treatment by the method of the invention to select an appropriate particle sized product. It has been found advantageous to employ as the catalyst substrate titanium dioxide having a particle size within the range 50 to 600 microns and surface area within the range 0.5 to 500 square meters per gram.

The selected titanium dioxide catalyst substrate is then treated with a source of vanadium pentoxide. The source can be any vanadium compound which is decomposable or oxidisable to vanadium pentoxide or the source may indeed be vanadium pentoxide itself. Typical examples of vanadium compounds which are oxidisable to vanadium pentoxide are soluble salts of vanadium such as vanadium sulphate, vanadium oxyhalides, metavanadates such as ammonium metavanadate or organic compounds of vanadium such as vanadium oxalate.

The treatment of the catalyst substrate with the source of vanadium can be effected in any convenient manner. For instance, the substrate can be treated with a solution of the vanadium source in a suitable solvent, or by treating the substrate with the source of vanadium in vapour form when the source is vapourisable or by using the source of vanadium as a liquid. Alternatively, the catalyst substrate may be mixed with the source of vanadium in solid form. Where the source of vanadium is vanadium pentoxide itself then this may be heated and the molten vanadium pentoxide drained through a tube or column containing the catalyst substrate.

The amount of the source of vanadium applied to the substrate at this stage in the method depends to a large extent on the particular surface area of the sample of the catalyst substrate but generally amounts of the source of vanadium equivalent to 0.1% to 99% expressed as $V_2O_5$ on the weight of $TiO_2$ are used. Preferably the amount of the source of vanadium added to the substrate is equivalent to 0.5% to 20% by weight expressed as $V_2O_5$ on the weight of $TiO_2$.

When the source of vanadium is not vanadium pentoxide then it is necessary to effect decomposition of the source to vanadium pentoxide and usually this is accomplished by heating the treated substrate in an oxygen-containing atmosphere at an elevated temperature. In fact, preferably the treated substrate is heated even when the source of vanadium is vanadium pentoxide itself. The treated substrate may be heated at a temperature within the range 350° C. to 600° C., eg 450° C. This heating may be carried out in any suitable furnace and if at the conclusion of the heating operation it is found that the substrate has been sintered then it will usually be necessary to grind the product and, if desired, sieve the product and discard any oversized or undersized particles. After treatment of the substrate with the source of vanadium pentoxide and subsequent heating, if any, the treated substrate is then washed to remove vanadium pentoxide from the substrate and it is believed during this operation unbound vanadium pentoxide is removed leaving a catalytically effective amount of vanadium pentoxide associated with the surface of the substrate.

It has been found possible to wash the substrate with a wide variety of wash liquids which have the effect of removing vanadium pentoxide. Typical wash liquids which can be used are suitable organic solvents such as aqueous alcohol and also aqueous liquids such as aqueous inorganic acids, aqueous inorganic alkalis and preferably water itself. Washing the treated substrate is continued until the effluent from the washing operation is substantially free from vanadium pentoxide and the time required to effect this depends naturally on the washing conditions, such as the ratio of the volume of wash liquid to the substrate and the speed of flow of the wash liquid through the substrate, or the temperature of the wash liquid and also on the amount of vanadium pentoxide originally applied to the substrate in the method of the invention.

Washing of the substrate can be effected in a wide variety of ways and the washing may be effected under pressure in which the wash liquid is pumped through the particulate catalyst substrate in a suitable vessel or, if desired, by allowing the wash liquid to percolate downwardly through a bed of the catalyst substrate. During the washing operation it is necessary to check the amount of vanadium pentoxide in the effluent wash water and this can be done by any analytical method with an accuracy suitable to detect the presence of a small amount of vanadium pentoxide.

In one particular case a catalyst substrate of rutile titanium dioxide having a surface area of 3.5 square meters per gram and carrying vanadium pentoxide in the amount of 3% by weight of the weight of $TiO_2$ was washed until the wash water contained no detectable vanadium pentoxide and it was found then that the catalyst so obtained still contained 0.7% by weight $V_2O_5$ on the weight of $TiO_2$.

After washing the total oxidation catalyst so obtained usually is dried and, if desired, may be ground. The product obtained may be sieved and any desired suitably sized fraction selected for use. For instance, when the catalyst is to be used in a fixed bed system then a suitable particle size range is 150 to 250 microns and in a fluid bed system a size range of 50 to 200 microns is suitable.

The total oxidation catalyst obtained by the method of the invention has been found to be useful to catalyse the oxidation of an oxidisable organic compound to carbon dioxide. Typical organic oxidisable compounds which may be oxidised in an oxygen-containing atmosphere by the catalyst prepared by the method of the invention are organic aliphatic hydrocarbons, aromatic hydrocarbons, carboxylic acids, aldehydes, acid anhydrides, esters or their mixtures. Other organic compounds which may be oxidised are those containing not only carbon and hydrogen and/or oxygen but other elements such as nitrogen, phosphorus or chlorine but in these cases the total oxidation will not only produce carbon dioxide and water but oxides of such other elements as are present. Care should be taken in the oxidation of this latter type of organic compound so that the catalyst is not poisoned by the presence of these additional elements.

The oxidation of the organic oxidisable compound can be effected in any oxygen-containing atmosphere such as air at an elevated atmosphere. For instance, the oxidation may be carried out by passing an oxidisable organic compound in the vapour form mixed with air through a bed of the catalyst maintained at a temperature of say 300° C. to 500° C. The gaseous products of the oxidation process can be discharged directly to atmosphere without harm when the product consists particularly of carbon dioxide and water.

The catalyst prepared by the method of the present invention is particularly useful for the oxidation of flue gases containing hydrocarbons which otherwise would pollute the atmosphere.

The invention is illustrated in the following Example.

EXAMPLE

Titanium dioxide prepared by the "sulphate" process containing 99% of the titanium dioxide in the rutile form and which had been calcined at 900° C. was selected as the catalyst substrate. The substrate had a surface area of 3.4 square meters per gram.

The total oxidation catalyst was prepared by impregnating the titanium dioxide substrate with an aqueous solution of vanadium sulphate. After impregnation the substrate contained an amount of vanadium sulphate equivalent to 3% by weight $V_2O_5$ on the weight of $TiO_2$.

The impregnated substrate was then dried overnight at 120° C. and then calcined for 24 hours at 450° C. to convert the vanadium sulphate to vanadium pentoxide.

A tube with a sintered glass base was filled with the impregnated and calcined substrate and cold water was allowed to pass through the tube and the substrate under gravitational pressure until the effluent discharged from the tube was free of vanadium pentoxide. The catalyst so obtained was then dried and found to contain vanadium pentoxide in an amount of 0.7% as $V_2O_5$ on the weight of $TiO_2$.

The catalyst so obtained was then used to oxidise various organic compounds. The catalyst was sieved and the fraction having the size range 150 microns to 250 microns selected. The catalyst was placed in a tube and the organic compound in vapour form mixed with air passed through the tube which was heated in a furnace to a temperature of about 350° C. The system was a fixed bed system. The particular organic compounds oxidised were o-xylene, maleic anhydride, phthalic anhydride, tolualdehyde and phthalide. It was found that each compound was oxidised totally to carbon dioxide and water.

As a comparison a similar oxidation process was carried out but using as the catalyst a sample of the material obtained by treatment of the titanium dioxide substrate with the vanadium compound but without washing the treated substrate free of removable vanadium pentoxide. It was found in this case that even when heating the compounds at a temperature in excess of 375° C., little of the organic compound was totally oxidised. In fact, the organic compound was only partially oxidised.

Similar oxidation processes carried out using as catalysts the titanium dioxide substrate free of vanadium pentoxide and vanadium pentoxide itself were not effective to any substantial extent in the total oxidation of the organic compounds to carbon dioxide.

What is claimed is:

1. A method for the manufacture of a total oxidation catalyst which comprises selecting a catalyst substrate comprising titanium dioxide, treating the substrate with a source of vanadium pentoxide, if necessary heating the treated substrate, washing the treated substrate with a wash liquid until the wash liquid is substantially free of vanadium pentoxide drying the washed substrate and recovering the dried washed total oxidation catalyst thereby obtained.

2. A method according to claim 1 in which the catalyst substrate has a particle size within the range 50 to 600 microns.

3. A method according to claim 1 in which the catalyst substrate has a surface area within the range 0.5 to 500 square meters per gram.

4. A method according to claim 1 in which the source of vanadium pentoxide is a soluble salt of vanadium.

5. A method according to claim 1 in which the source of vanadium pentoxide is an organic compound of vanadium.

6. A method according to claim 1 in which the source of vanadium pentoxide is vanadium pentoxide itself.

7. A method according to claim 1 in which the catalyst substrate is treated with a solution of the source of vanadium in a suitable solvent.

8. A method according to claim 1 in which the catalyst substrate is treated with the source of vanadium in vapour form.

9. A method according to claim 6 in which the catalyst substrate is treated with molten vanadium pentoxide.

10. A method according to claim 1 in which the catalyst substrate is treated with an amount of the source of vanadium equivalent to 0.1% to 99% by weight expressed as $V_2O_5$ on the weight of $TiO_2$.

11. A method according to claim 10 in which the amount is from 0.5% to 20% by weight expressed as $V_2O_5$ on the weight of $TiO_2$.

12. A method according to claim 1 in which the catalyst substrate after treatment with the source of vanadium pentoxide is heated at a temperature within the range 350° C. to 600° C.

13. A method according to claim 1 in which the wash liquid is selected from the group consisting of water, aqueous alcohols, aqueous inorganic acids and aqueous inorganic alkalis.

14. A method according to claim 13 in which the catalyst contains 0.7% by weight $V_2O_5$ on the weight of $TiO_2$ after washing.

* * * * *